(12) United States Patent
Ayan et al.

(10) Patent No.: US 8,720,552 B2
(45) Date of Patent: *May 13, 2014

(54) TOOL AND METHOD FOR DETERMINING FORMATION PARAMETER

(75) Inventors: Cosan Ayan, Istanbul (TR); Fikri John Kuchuk, Meudon (FR); Terizhandur S. Ramakrishnan, Boxborough, MA (US); Thomas J. Neville, Wellesley, MA (US); Raghu Ramamoorthy, Pune (IN); Andrew Carnegie, Kuala Lumpur (MY)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/252,015

(22) Filed: Oct. 3, 2011

(65) Prior Publication Data

US 2012/0024523 A1 Feb. 2, 2012

Related U.S. Application Data

(63) Continuation of application No. 12/103,027, filed on Apr. 15, 2008, now Pat. No. 8,297,354.

(51) Int. Cl.
*E21B 43/12* (2006.01)
*E21B 47/00* (2012.01)

(52) U.S. Cl.
USPC .................................. 166/250.15; 73/152.39

(58) Field of Classification Search
USPC ............... 73/152.29, 152.31, 152.36, 152.39, 73/152.41, 152.42; 166/250.17, 250.01, 166/261, 250.02, 250.03, 252.2, 254.2, 66, 166/66.5, 100
See application file for complete search history.

(56) References Cited

U.S. PATENT DOCUMENTS

| | | | |
|---|---|---|---|
| 3,289,474 A | * | 12/1966 | Smith ........................ 73/152.41 |
| 4,168,746 A | | 9/1979 | Sheely |
| 4,427,944 A | | 1/1984 | Chandler |
| 4,529,939 A | | 7/1985 | Kuckes |
| 5,148,705 A | | 9/1992 | Desbrandes |
| 5,269,180 A | | 12/1993 | Dave et al. |

(Continued)

FOREIGN PATENT DOCUMENTS

| | | |
|---|---|---|
| RU | 2242772 C2 | 12/2004 |
| RU | 2305877 C2 | 9/2007 |
| WO | 2007069201 A2 | 6/2007 |
| WO | 2008152345 A2 | 12/2008 |

OTHER PUBLICATIONS

Grant Notice of Russian Application U.S. Appl. No. 2010146165 dated Feb. 1, 2012.

(Continued)

*Primary Examiner* — Kenneth L Thompson
*Assistant Examiner* — James Sayre
(74) *Attorney, Agent, or Firm* — Kenneth Liu; Jeremy Berman (57) ABSTRACT

An apparatus and method of measuring a parameter characteristic of a rock formation in an oil well is provided with a device for generating a sensing field within a volume of the rock formation and a device for causing a flow through the volume in the presence of the sensing field, further including sensors responsive to changes in the volume, wherein a sensor response is indicative of the amounts of fluid, particularly hydrocarbon and water saturations and irreducible hydrocarbon and water saturations. Measurements can be made before the flow affects the measuring volume and after onset of the flow through the measuring volume.

26 Claims, 5 Drawing Sheets

(56) References Cited

U.S. PATENT DOCUMENTS

| | | | |
|---|---|---|---|
| 5,335,542 | A | 8/1994 | Ramakrishnan et al. |
| 5,497,321 | A | 3/1996 | Ramakrishnan et al. |
| 5,826,656 | A * | 10/1998 | McGuire et al. ............ 166/305.1 |
| 6,301,959 | B1 | 10/2001 | Hrametz et al. |
| 6,348,792 | B1 | 2/2002 | Beard et al. |
| 6,518,758 | B1 | 2/2003 | Speier et al. |
| 6,528,995 | B1 | 3/2003 | Speier et al. |
| 6,531,869 | B1 | 3/2003 | Speier et al. |
| 6,538,438 | B1 | 3/2003 | Speier et al. |
| 6,642,715 | B2 | 11/2003 | Speier et al. |
| 6,690,170 | B2 | 2/2004 | Homan et al. |
| 6,710,596 | B2 | 3/2004 | Speier et al. |
| 6,856,132 | B2 | 2/2005 | Appel et al. |
| 6,886,632 | B2 * | 5/2005 | Raghuraman et al. ...... 166/252.4 |
| 6,978,672 | B1 | 12/2005 | Chen et al. |
| 7,032,661 | B2 * | 4/2006 | Georgi et al. ............ 166/250.01 |
| 7,180,288 | B2 | 2/2007 | Scheven |
| 7,191,831 | B2 | 3/2007 | Reid et al. |
| 7,221,158 | B1 | 5/2007 | Ramakrishnan |
| 7,233,150 | B2 | 6/2007 | Chen et al. |
| 7,243,718 | B2 | 7/2007 | Chen et al. |
| 7,301,345 | B2 | 11/2007 | Chen et al. |
| 7,532,007 | B2 * | 5/2009 | Song et al. .................... 324/303 |
| 2003/0192689 | A1 * | 10/2003 | Moake et al. ............ 166/250.01 |
| 2003/0229448 | A1 | 12/2003 | Storm, Jr. et al. |
| 2004/0055745 | A1 | 3/2004 | Georgi et al. |
| 2005/0279497 | A1 | 12/2005 | Chen et al. |
| 2006/0000606 | A1 | 1/2006 | Fields et al. |
| 2006/0089804 | A1 | 4/2006 | Chen et al. |
| 2007/0039731 | A1 | 2/2007 | Fox et al. |
| 2007/0057674 | A1 | 3/2007 | Chen et al. |
| 2007/0170924 | A1 | 7/2007 | Chen et al. |
| 2008/0066536 | A1 | 3/2008 | Goodwin et al. |

OTHER PUBLICATIONS

Ramakrishnan, T.S., et al., Water-Cut and Factional-Flow Logs From Array-Induction Measurements, SPE 54673, Society of Petroleum Engineers Reservoir Evaluation & Engineering, Feb. 1999, vol. 2, No. 1, pp. 85-94.

Freedman, R., et al., A New NMR Method of Fluid Characterization in Reservoir Rocks: Experimental Confirmation and Simulation Results, SPE 63214, 2000 Society of Petroleum Engineers Annual Technical Conference and Exhibition, Dallas, Texas, Oct. 2000, pp. 1-15.

Cassou, G., et al. Movable oil saturation evaluation in an ultra-mature carbonate environment, Society of Petrophysicists and Well Log Analysts 1st Annual Middle East Regional Symposium, Abu Dhabi, UAE, Apr. 2007, pp. 1-16.

Patent Cooperation Treaty International Search Report, Form PCT/ISA/210, Date of mailing Sep. 1, 2009, pp. 1-4.

Ramakrishnan, et al., "Water-Cut and Fractional-Flow Logs From Array-Induction Measurements", SPE 54673, Society of Petroleum Engineers Reservoir Evaluation & Engineering, vol. 2(1), 1999, pp. 85-94.

PCT International Search Report for Application No. PCT/US09/40627 dated Sep. 9, 2010, 4 pages.

* cited by examiner

TOOL AND METHOD FOR DETERMINING FORMATION PARAMETER

CROSS REFERENCE TO RELATED APPLICATIONS

This patent application claims the priority and is a continuation of U.S. patent application Ser. No. 12/103,027, now U.S. Pat. No. 8,297,354, filed Apr. 15, 2008 which is incorporated by reference herein in its entirety.

FIELD OF THE INVENTION

The invention relates to apparatus and methods for determining parameters representative of formation properties and formation fluid properties of subterranean reservoirs, particularly hydrocarbon reservoirs. More specifically, the invention relates to apparatus and methods for measuring formation parameters at the location of an induced flow in the formation.

BACKGROUND

In the course of assessing and producing hydrocarbon bearing formation and reservoirs, it is important to acquire knowledge of formation and formation fluid properties which influence the productivity and yield from the drilled formation. Typically such knowledge is acquired by methods generally referred to as "logging".

Logging operations involve the measurement of a formation parameter or formation fluid parameter as function of location, or more specifically depth in a wellbore. Formation logging has evolved to include many different types of measurements including measurements based on acoustic, electro-magnetic or resistivity, and nuclear interactions, such as nuclear magnetic resonance (NMR) or neutron capture.

NMR measurements are commonly used in the wellbore to probe the NMR decay behavior of the stationary fluid in the reservoir rock. During these measurements, magnetic fields are established in the formation using suitably arranged magnets. The magnetic fields induce nuclear magnetization, which is flipped or otherwise manipulated with on-resonance radio frequency (RF) pulses. NMR echoes are observed, and their dependence on pulse parameters and on time is used to extract information about the formation and the fluids in it.

In particular, NMR has been used in the oilfield industry to obtain information and parameters representative of bound fluids, free fluids, permeability, oil viscosity, gas-to-oil ratio, oil saturation and water saturations. All these parameters can be derived from measurements of spin-spin relaxation time, often referred to as T2, spin-lattice relaxation time (T1), and self-diffusion coefficient (D) of the molecules containing hydrogen contained in formation fluids.

On the other hand, fluids are routinely sampled in the well bore with the help of so-called formation testers or formation fluid sampling devices. An example of this class of tools is Schlumberger's MDT™, a modular dynamic fluid testing tool. Such a tool may include at least one fluid sample bottle, a pump to extract the fluid from the formation or inject fluid into the formation, and a contact pad with a conduit to engage the wall of the borehole. When the device is positioned at a region of interest, the pad is pressed against the borehole wall, making a tight seal and the pumping operation begins.

With the pumping a flow in the formation is induced by extracting fluid from the formation through the conduit. The fluid flowing through the tool is analyzed in situ using electrical, optical or NMR based methods. Typically when the fluid is assumed to be 'pure' reservoir fluid, i.e., when having acceptable levels of mud or other contaminants, a sample of the fluid is placed into the sample bottle for later analysis at a surface laboratory. The module is then moved to the next region of interest or station.

Fluid flow into the borehole is also routinely produced using dual packer arrangements, which for example isolate sections of the borehole during fluid and pressure testing, essentially in the same manner as described for the MDT tool described above. By reversing the flow direction dual packer arrangements offer the possibility of conducting fracturing operations which are designed to fracture the formation around the isolated section of the borehole.

When specifically attempting to inject rather than extract fluid from the formation, a testing tool may require modifications such as described for example in the co-owned U.S. Patent Application 2006/0000606. The tool described therein is a formation tester for open hole formations incorporating a drill bit to drill through the mudcake which accumulates on the wall of the well bore or through zones damaged or contaminated by the drilling process. The tool as described in U.S. 2006/0000606 is capable of injecting fluid into the formation surrounding wellbore for various purposes such as fracturing the formation near the wellbore.

It is further well established to mount logging tools on either dedicated conveyance means such as wireline cables or coiled tubing (CT) or, alternatively, on a drill string which carries a drill bit at its lower end. The latter case is known in the industry as measurement-while-drilling (MWD) or logging-while-drilling (LWD). In MWD and LWD operations the parameter of interest is measured by instruments typically mounted close behind the bit or the bottom-hole assembly (BHA). Both, logging in general and LWD are methods known as such for several decades and hence are believed to require no further introduction.

Applications and measurements designed to exploit the flow generated by tools such as the above formation testing tools in combination with NMR type measurements are described in a number of documents. One example of these published documents is the co-owned U.S. Pat. No. 7,180,288 to Scheven. Another detailed description of possible NMR-based methods for the purpose of monitoring flow and formation parameters can be found in the co-owned U.S. Pat. No. 6,642,715 to Speier et al. and U.S. Pat. No. 6,856,132 to Appel et al. A tool which combines a fluid injection/withdrawal tool with a resistivity imaging tool is described for example in the co-owned U.S. Pat. No. 5,335,542 to Ramakrishnan et al. Borehole tools and methods for measuring permeabilities using sequential injection of water and oil is described in the co-owned U.S. Pat. No. 5,269,180 to Dave and Ramakrishnan and in the co-owned U.S. Pat. No. 7,221,158 to Ramakrishnan. In the co-owned U.S. Pat. No. 5,497,321 to Ramakrishnan and Wilkinson, the authors suggest a method to compute fractional flow curves using resistivity measurements at multiple radial depths of investigation.

In a paper prepared for presentation at the SPWLA 1st Annual Middle East Regional Symposium, Apr. 15-19, 2007, Gilles Cassou, Xavier Poirier-Coutansais and one of the inventors of the present invention, Raghu Ramamoorthy, demonstrate that the combination of advanced-NMR fluid typing techniques with a dual-packer fluid pumping module can greatly improve the estimation of the saturation parameter in carbonate rocks. The ability to perform 3D-NMR stations immediately before and after pump-outs yields both the water and oil saturations (Sw,Sxo) independently of lithology, resistivity, and salinity, in a complex carbonate environment.

However, the method as demonstrated suffers from a number of limitations which makes it difficult to conduct reliable and accurate measurements. Both tools have to be accurately positioned at the same depth at different times. The two 3D-NMR acquisitions must be performed at exactly the same depth as the sampling operation for the manipulation of the formation to be reflected in the 3D-NMR measurement. Given that both tools need to be moved up and down the wellbore to position them correctly—and given further that the uncertainty in tool positioning is at least as large as the dimensions of a typical NMR antenna—the tested implementation as described is not optimal. Moreover, operational problems dictate that the tests cannot be performed by the probe directly because it becomes then more difficult to ensure that the NMR antenna is positioned exactly over the test interval, instead the dual packer configuration has to be used.

Furthermore, the time to unset the dual packers and move the NMR tool down to the correct position at the test interval is about 10 minutes. A typical 3D-NMR measurement may require another 15 minutes of time at the station. If significant re-invasion occurs during this time, the post-pumpout 3D-NMR data is affected and can no longer be correlated with the flow regime as induced by the tool.

In view of the known art, it is therefore seen as one object of the invention to improve and enhance known apparatus and methods for characterizing formations using induced flow in the formation. It is seen as another object to provide more and better methods of determining characteristic formation and formation fluid properties using measuring apparatus having a volume of investigation overlapping or co-located with the volume in which induced flow occurs.

SUMMARY OF INVENTION

According to a first aspect of the invention, tools and method for measuring a parameter characteristic of a rock formation are provided, including having in a section of a well penetrating the rock formation a device for generating a sensing field in a measuring volume within the rock formation and a device for causing a flow through the measuring volume, preferably in the presence of the sensing field, and sensors responsive to changes in the sensing field, wherein sensor responses are indicative of the amounts of fluid in the measuring volume in different states of the flow, preferably including a state before the generated flow affects the measuring volume and a state after onset of the flow through the measuring volume.

An amount of fluid is defined for the purpose of the invention to include parts or percentages of formation fluid which consists of hydrocarbon and/or parts or the percentage which consists of water. In the industry, two of the most utilized of such parameters are often referred to as hydrocarbon saturation (Shc) or oil saturation (So) and water saturation (Sw), respectively.

In a variant of these embodiments, a fluid is either withdrawn or more preferably injected into the formation to sweep away the hydrocarbon and obtain a measure of the residual oil saturation (ROS) with the subsequent measurements. In an alternative variant, a hydrocarbon-based fluid such as formation crude oil can be injected into the formation to estimate the amount of the residual water saturation (Swr). Both parameters, ROS and Swr are important end-points in the determination of the relative permeabilities relations as a function of saturation and can thus be ultimately used to determine a measure of the recovery factors for the reservoir.

In a further variant of this embodiment, the saturation of a phase in the formation and flow rates or cuts of fluid phases are measured. Knowledge of the flow volumes or fractional flows in dependence of the saturation can be used to derive directly the relative permeability of a phase in the formation.

The invention further contemplates the use of a sensing field based on any of the known logging measurement which can sense the change of a parameter within the formation, including sonic, acoustic, magnetic and electro-magnetic sensing fields. Hence the sensors are preferably responsive to one of these types of fields and register electro-magnetic signals, resistivity signals, dielectric signals, NMR signals and neutrons capture. In an even more preferred variant, the sensors register any such signals at multiple depths as measured in radial direction from the well. In a preferred embodiment, the sensing field comprises a magnetic field. In a variant of this embodiment, distributions of the spin-lattice relaxation or T1 distributions or distributions of spin-spin relaxation (T2) are derived from the sensor response. However, for the in situ measurements of the time-evolution of a parameter, faster methods based for example on induction or resistivity arrays may be preferred making hence use of tools such as the resistivity imaging tool described in U.S. Pat. No. 5,335,542.

In a preferred variant of the NMR based methods, magnetic resonance fluid (MRF) characterization is applied to the sensor response. Magnetic resonance fluid (MRF) characterization is a multi-sequence NMR acquisition where polarization time and echo spacing are varied resulting in a sensitivity to diffusion and T1 and T2 distributions. MRF measurements can be used to measure both Sw and So in carbonates independent of lithology, resistivity and salinity.

The capability to perform and compare two or more MRF measurements in a time-lapse manner before and after an induced flow reduces some of the uncertainties caused by the drilling process and formation invasion. Invasion of drilling fluid filtrate changes the fluid composition near the wellbore. Flowing from the formation into the tool has the effect of replacing filtrate with formation fluid, thus placing the measuring volume in the formation into a state much closer to the original formation. Controlled injection of a known fluid on the other hand can be used advantageously to create a zone which is more completely flushed than by merely the uncontrolled and unmonitored invasion of mud filtrate.

While it is possible to generate flow by any tool which is capable of causing a pressure gradient across the surface of the well, the present invention employs preferably tools and method which are coupled with means to determine flow related parameters. Preferred tools are therefore variants of the known formation sampling tools modified such that the sensing tool can project its sensing field into the volume of the formation subject to the flow caused by the sampling tool.

Typically the flow is caused by engaging the wall of the well with a probe of the sampling tool and using a pumping mechanism to withdraw fluid from the formation. However, in a further embodiment of the invention the flow can be alternatively or alternatingly caused by injecting a fluid into the formation. In this embodiment of the invention, the parameter can be measured while having a flow into and out of the formation.

In another aspect of the invention, the monitored amounts of fluids in the formation can be analyzed for compositional changes in the hydrocarbon phase as caused by the flow. Again, it is a preferred embodiment of this aspect of the invention to repeat stationary measurements under different flow conditions, i.e. before, during and after the induced flow.

In a preferred embodiment of this aspect of the invention, the amount or total volume of hydrocarbon in a measuring volume within the formation is decomposed in accordance with the values of a parameter which can be derived from the measurement. It can be observed that these fractioned or decomposed parts of the hydrocarbon behave differently under different flow conditions. Such measurements can therefore lead to parameters related to the composition of the formation fluid. In a variant of this embodiment, this parameter is the T1 or T2 distribution or a parameter derivable from these distributions, such as viscosity. Observing the reservoir fluid decomposed according to such a parameter allows for better estimates of recoverable reserves and/or the effectiveness of enhanced oil recovery (EOR) treatments.

In accordance with a further aspect of the invention, the method can be used to determine the effectiveness of enhanced oil recovery in various manners. Enhanced oil recovery (EOR) methods include the injection of specialized chemical compounds such as surfactants or water blocking gels into the formation. EOR methods also include thermal-based reservoir treatments such as steam or gas injections. By monitoring the reaction of the fluid in the measuring volume within the formation, it is possible to estimate the efficacy of such an EOR treatment on a larger reservoir scale. In an embodiment of this aspect of the invention, the effectiveness of chemicals, such as surfactants, when injected into the formation can be monitored in situ and evaluated accordingly to derive further important parameters such as effective hydrocarbon recovery factors with and without the treatment.

Further details, examples and aspects of the invention will be described below referring to the drawings listed in the following.

DETAILED DESCRIPTION

Figure 1A:
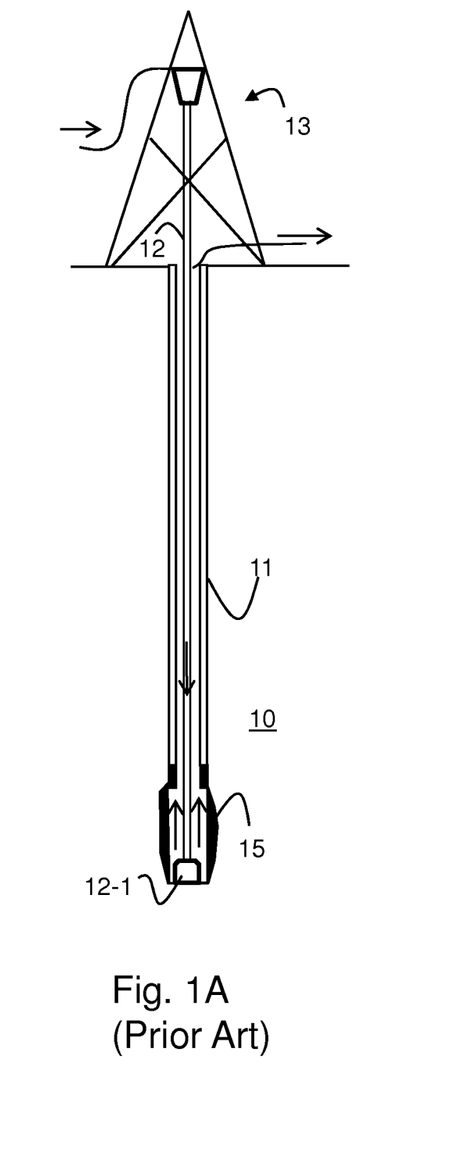
FIG. 1A illustrates a conventional drilling operation.

In FIG. 1A, a well 11 is shown in the process of being drilled through a formation 10. A drill string 12 is suspended from the surface by means of a drilling rig 13. A drill bit 12-1 is attached to the bottom of the drill string 12.

While drilling, a drilling fluid is circulated through the drill string 12 and the drill bit 12-1 to return to the surface via the annulus between the wall of the well 11 and the drill string 12. During this process, part of the drilling fluid invades a shallow zone 15 around the borehole 11 thus contaminating the formation fluid.

Figure 1B:
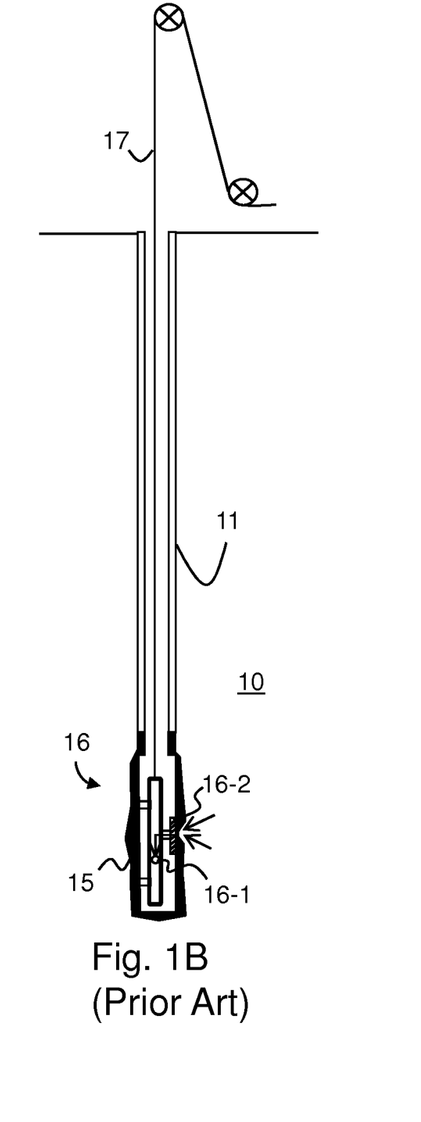
FIG. 1B illustrates a logging operation in accordance with an example of the present invention.

After completing the drilling through a hydrocarbon bearing formation, a wireline tool 16 as shown in FIG. 1B is lowered into the well 11 using a wireline cable 17. In the example as illustrated, the wireline tool includes a formation testing device 16-1 to be used for generating a flow in the formation and an NMR-based tool 16-2 with a combination of permanent magnets and antennas (not shown) to generate a magnetic field within the volume of the formation affected by the flow. Such tools have been described in the prior art, including the co-owned U.S. Pat. No. 7,180,288 to Scheven, the co-owned U.S. Pat. No. 6,642,715 to Speier et al., and the U.S. Pat. No. 6,856,132 to Appel et al.

Figure 2A:
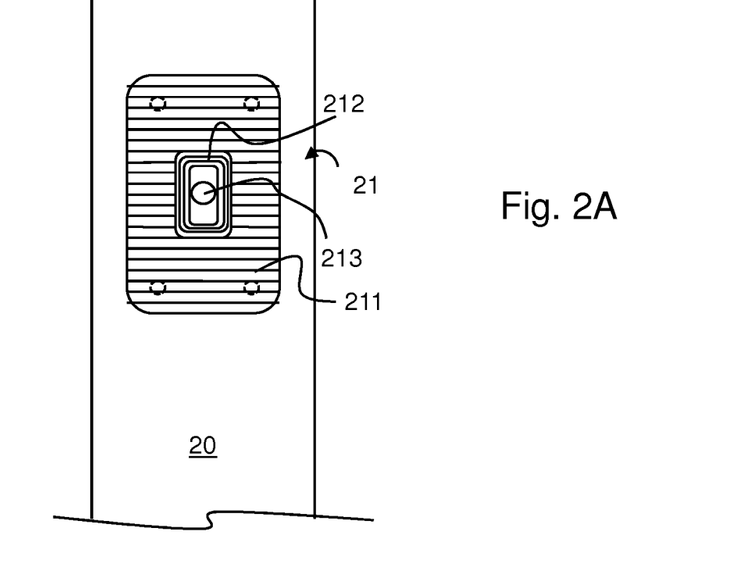
FIGS. 2A and 2B show a schematic frontal and a cross-sectional view of a tool for use in the present invention.
Figure 2B:
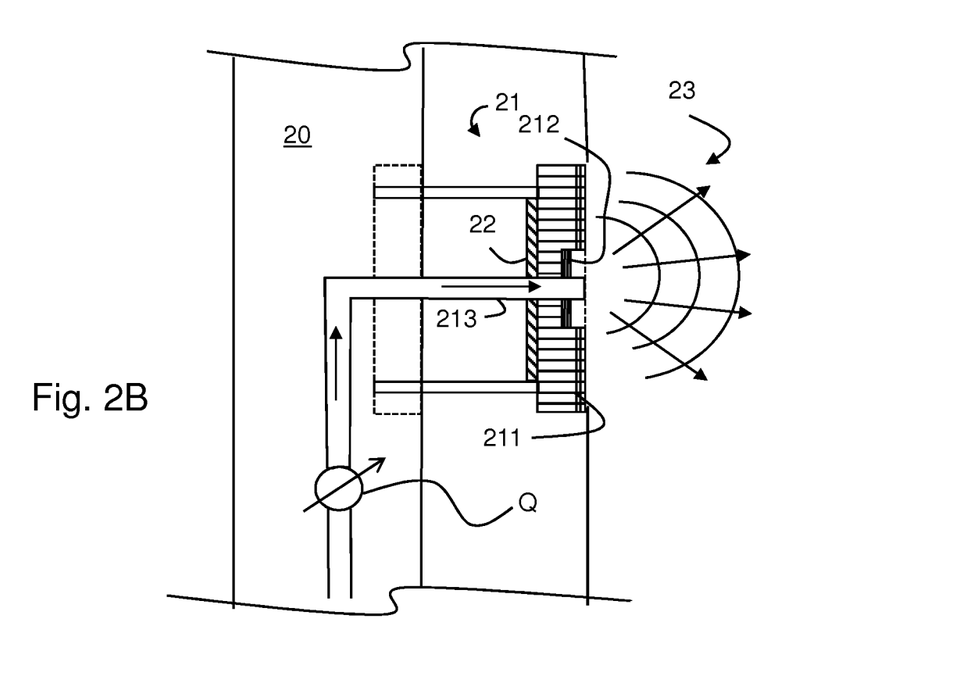

A further variant of such a tool is illustrated in FIGS. 2A and 2B showing a frontal and cross-sectional view, respectively, of the schematics of a combined sampling and NMR tool.

The body 20 of the downhole logging tool includes a sampling probe taking the shape of a pad 21. The pad 21 includes an outer zone 211 of magnetic material behind a sealing layer of elastic material. The magnetic material of this example is permanently magnetic and can hence generate a magnetic field in those parts of the formation which face the probe. An inner zone of the pad 21 includes an antenna area 212 and the flowline 213. A feed circuit 22 to power and control the antenna is located behind the pad 21. The flowline includes a flowmeter Q similar to the known devices.

The antenna is designed to deliver NMR pulses 23 into the formation. The tool as illustrated is in a state of injecting fluid from the tool body 20 into the formation 10. In other states, fluid may flow in reverse direction, i.e., from the formation 10 into the flowline 213. The tool shown is distinguishable from known designs of combined sampling and NMR tools by having the antenna 212 in a recessed area of the pad 21. It is seen as a novel aspect of such designs to have the recessed area act effectively like a funnel, thus drawing in or injecting flow from a bigger effective area and in turn enlarging the measuring volume where flow and magnetic field overlap. The recessed area serves further to protect the antenna from the impact and sealing forces acting when the pad makes contact with the formation.

For an electro-magnetic or resistivity-based measurement, the combination of an NMR tool and formation testing tool as shown above can be replaced by a combination of resistivity array tool and formation testing tool. Such a tool is described for example in the co-owned U.S. Pat. No. 5,335,542 to Ramakrishnan et al. Other sensing fields require a corresponding change of the type of source and receivers in the tool body. However for most of the known sensing fields whether acoustic, sonic or electromagnetic, corresponding logging tool designs exists and can be thus adapted to methods and tools described herein.

Integrated into the flowline of the sampling tool are typically further measuring devices (not shown), such as optical, NMR, or resistivity based sensors etc., to measure composition-related parameters of the sampled or ejected flow inside the tool. These devices include also flowmeters Q to determine the total flow Qw+Qo and the water flow Qw and the hydrocarbon flow Qo. The flowline 213 is further connected to a flow generator or pump (not shown) located within the body of the logging tool. The flow generator is designed to move fluids from the formation into the body of the tool or from a storage tank (not shown) within the body of the tool into the formation.

Figure 3:
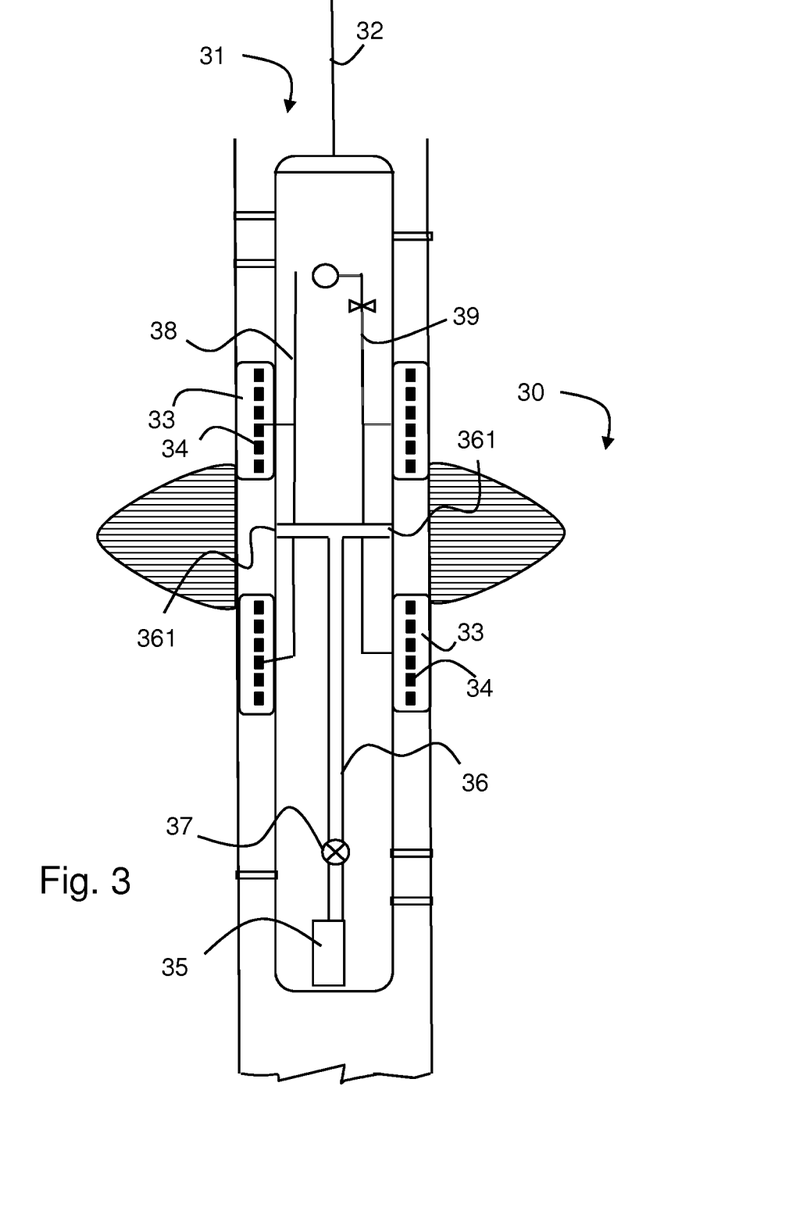
FIG. 3 shows a schematic cross-sectional view of another tool for use in the present invention.

A wireline suspended dual packer tool suitable for performing measurements in accordance with another example of the invention is shown in FIG. 3. The tool 31 of FIG. 3 is suspended from a wireline 32 into an open hole. It has a pair of packers 33 with integrated arrays of sensors 34. The sensors can be designed as an array of electrodes, antennas gamma-ray receivers or emitters etc. depending on the measurement to be performed. The pair of packers isolates a zone 30 of the formation. The tool further comprises a fluid reservoir chamber 35 connected to the fluid ports 361 via a flow line 36. The flow through the flow line 35 is driven by a pumping module 37. The pumping module can be designed to support flow from the formation into the reservoir chamber or from the chamber into the formation. Depending on the type of experiment to be performed, the chamber may contain sample fluids such as water or oil, or solutions of active chemicals to modify the formation, the formation fluids, or the response of the formation or formation fluid to the sensing field. The lines 38 and 39 provide an electrical connection and a hydraulic connection, respectively, to the packer 33 and the sensors 34.

It is important to note that the measurement as proposed in the present invention will result in a response signal from the fluid as located inside the measuring volume and hence inside the formation. Previous efforts of combining NMR and a sampling tool have mostly focused on measuring the properties of the sampled fluid or its velocity after it leaves the formation and moves through the flow line of the tool. In the present invention, the sampling tool is employed as a means to generate a flow in the formation. This flow changes the values of parameters associated with the formation whilst leaving others unchanged. It has been observed that by recording such changes, parameters of great importance for the characterization of the formation can be determined with potentially much higher accuracy, revealing even previously unknown aspects.

Figure 4A:
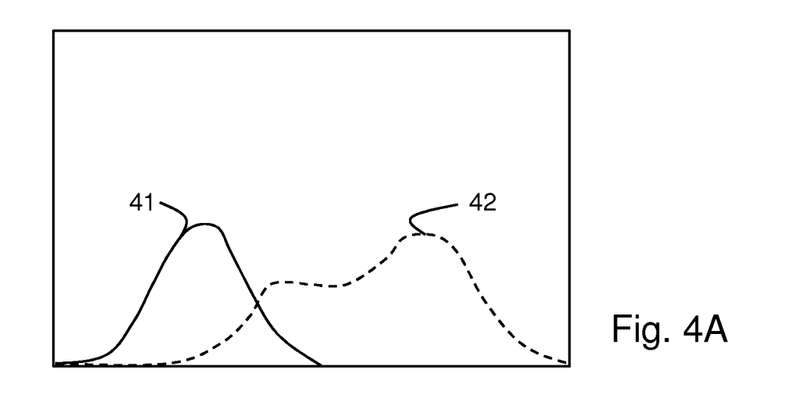
FIG. 4A illustrates a typical measurement as performed by an NMR tool.

In a first example of an embodiment of the invention, the oil and water saturations of the formation fluids are determined as a function of the flow rate. The saturations can be determined for example by evaluating measured T1 or T2 distribution curves. To illustrate the principle of the evaluation, a simplified example of such curves is shown in FIG. 4A. The water signal is shown as a solid line 41 and oil as a dashed line 42. Saturations can be determined from such a measurement by calculating the ratio of the relative areas under the curves to the total area.

The response of the formation to many measurements, including the NMR type measurement above, can be modified through injection of a suitable chemical. Using for example either MnCl2 or NiCl as part of any injected fluid reduces the water response signal or, at the very least, shifts it to very short T2 values. This effect results in a clear separation between the water and oil signals in the T2 domain and the residual oil saturation estimation becomes a simple volumetric determination based on the measured T2 distribution.

Whilst the example as illustrated is simplified in order to make important aspects more transparent, it is expected that real measurements are based on more advanced methods of evaluating NMR data such as MRF methods or other any known method to acquire and interpret three dimensional (3D) NMR data. For details of the theory and implementation of the MRF method, reference can be made to Freedman, R., Sezginer, A., Flaum, M., Matteson, A., Lo, S., and Hirasaki, G. J.: "A New NMR Method of Fluid Characterization in Reservoir Rocks: Experimental Confirmation and Simulation Results," SPE 63214, Transactions of the 2000 SPE Annual Technical Conference and Exhibition, Dallas, Tex., USA, 1-4 Oct. 2000.

With the saturation values determined using either the NMR based methods as described in the above example or measurements based on other sensing fields, the flowmeter Q can be used to measure the water cut or flow Qw and/or the hydrocarbon cut or flow Qo of the sampling tool. The term "cut" is used to indicated the amount of a single phase in what is typically a multiphase flow produced from the borehole.

If required, the time lag between the flow measurements and the saturation measurements can be compensated for by for example calculating the average flow velocity between the location of the saturation measurement and the flowmeter location inside the tool body. Another way of performing such compensation may include using correlations between the NMR measurements and the flowmeter and selecting the time lag which maximizes such correlations. The compensation ensures that the measurement as performed by the flowmeter reflects the composition of the flow as it passes through the measuring volume of the NMR tool for evaluation.

In a preferred embodiment of the invention the measured saturations and flow rates are matched to fit a relations or model which includes the relative permeabilities k(ro) or k(rw). In principle all measured points lie on curves such as shown in FIG. 5A.

Figure 5A:
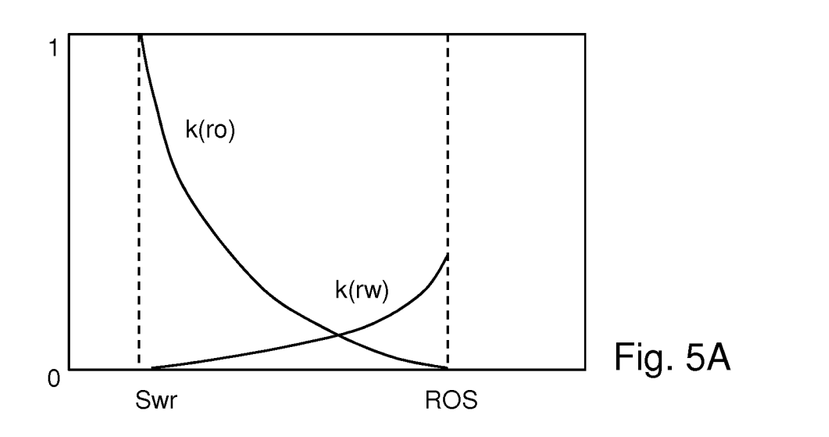
FIGS. 5A and 5B illustrates interpretations enabled by the present invention.
Figure 5B:
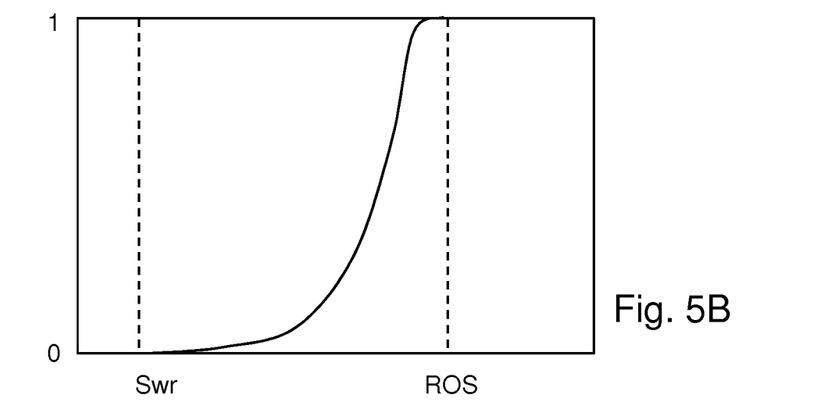

In FIG. 5A, there are shown the relative permeability kro of hydrocarbon as a function of saturation and the relative permeability krw of water as a function of saturation. The endpoints of both curves are defined by the residual water saturation Swr and the residual hydrocarbon saturation ROS. Based on the current knowledge of the theory of this relation, it is in many cases not required to determine more than two points to derive a useful estimate of a relative permeability curve. These two points could be the permeability at the residual water saturation Swr and the residual hydrocarbon saturation ROS. However the accuracy of such an estimate or model is increased by determining more measurements points on the curves. A further, more detailed example of a model based approach for evaluating saturation measurements to derive relative permeabilities is described in: "Water-cut and fractional-flow logs from array-induction measurements" by T. S. Ramakrishnan and D. J. Wilkinson, 1999 SPE Reservoir Evaluation and Engineering 2 (1), pp. 85-94.

Figure 4B:
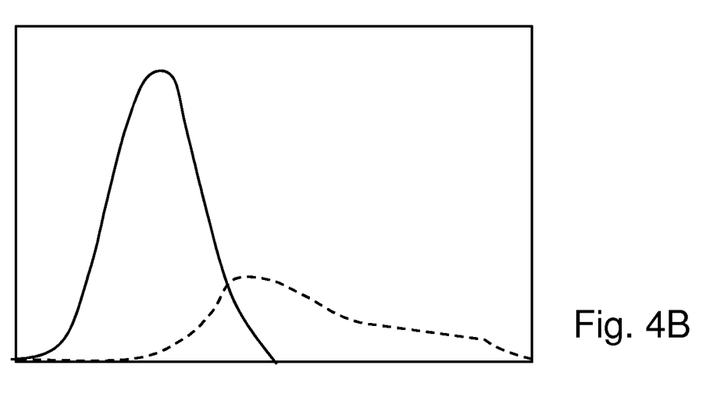
FIG. 4B shows another possible measurement based on the present invention.

Once the relative permeabilities krw(Sw) and kro(Sw) are established as functions of the saturation, it is possible to derive the fractional flow using for example equation [1] below with µw being the µw and $$fw(Sw)=(krw(Sw)/\mu w)/(krw(Sw)/\mu w + kro(Sw)/\mu o) \quad [1]$$

resulting in curves for the fractional flowrates as a function of the saturation as shown for the flowrate fw(Sw) of the water phase in FIG. 4B. Once established, this function can be used to determine important parameters. For example, a measure of the recoverable oil in the formation can be derived by measuring the actual saturations and their respective distance to the endpoints of the saturation curves indicating the residual oil or water saturations.

In another example of the invention, the T1 or T2 distributions as shown in FIG. 4A can be recorded as a function of time and hence as a function of the flow which passed through the monitored formation volume. The benefit of such a measurement can be demonstrated by comparing the schematic FIGS. 4A and 4B. The latter figure shows the same measuring volume but after an injection of water.

The measured distribution gives an indication of the residual oil saturation ROS by evaluating the area of the "oil peak", which is reduced after the injection of water from the tool as described above. However apart from the determination of saturations, the distribution can further be evaluated to make determinations as to the composition of the hydrocarbon.

It is generally known that the absolute value of T1 or T2 can be linked to fluid related parameters such as viscosity. Hence each value of T1 (or T2) is taken in this example as a value representative of viscosity.

In FIGS. 4A and 4B, which together illustrates the case of a composition change in the formation fluid due to a water injection, the oil peak is not only reduced in amplitude, but the amplitude reduction in FIG. 4B relative to the original amplitudes of FIG. 4A differs for different values of T1. In the illustrated example, the composition of the formation oil has changed, with the low viscosity fractions of the oil (at higher T1 values) being apparently flushed more effectively from the formation than the higher viscosity fractions. The higher viscosity portion of the formation oil remains in place and forms a relatively larger fraction of the residual oil which cannot be produced by water injection or flush alone.

To observe compositional changes such as described in the example above provides important information to assist in decisions concerning the methods chosen at various stages in the life of the reservoir to recover its hydrocarbon content. It can also be used in determining the most efficient form of EOR treatment. If, for example, the recoverable oil left in the formation is more viscous than the produced oil, EOR treatments will need to be planned differently taking into account the change in the viscosity of the remaining oil.

Apart from drawing conclusions on the efficacy of types of EOR treatments, it is further possible to measure the effects of such a treatment on a very small scale but within a very short time period. Repeating the injection measurements as described above with an EOR treatment fluid rather than water, it is possible to monitor directly the changes in the formation, in particular the residual oil saturation without and with the EOR treatment tested. When testing a chemical based method, the relevant chemical components can be mixed to the internal fluid flow inside the tool. If a heat treatment is contemplated for testing, the fluid injected can be heated inside the tool body prior to injection into the formation. Thus the invention can provide a very fast screening method for a wide variety of existing and future EOR treatments which would otherwise take months or even years to test.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, where as a screw employs a helical surface, in the environment of fastening wooden parts, a nail and a screw may be equivalent structures. It is the express intention of the applicant not to invoke 35 U.S.C. §112, paragraph 6 for any limitations of any of the claims herein, except for those in which the claim expressly uses the words "means for" together with an associated function.

What is claimed is:

1. A tool for characterizing a subterranean formation, the tool comprising:
a sampling probe having a moveable pad that is operable to contact a borehole wall in the formation, wherein the pad includes a nuclear magnetic resonance (NMR) sensing device having:
a magnetic material disposed in the pad for generating a sensing field within a measuring volume of the formation; and
an antenna disposed in a recess formed on a surface of the pad facing the borehole wall, wherein the antenna is configured to deliver NMR pulses into the formation;
a flow generating device for causing a flow through the measuring volume by injecting fluids into the formation; and
NMR sensors responsive to changes in the sensing field; wherein sensor responses are indicative of an amount of constituent fluid phases in the measuring volume under at least two different flow conditions in the formation.

2. The tool of claim 1 wherein the at least two different flow conditions include at least one of the condition before the flow generating device caused the flow and the condition after the flow generating device caused the flow.

3. The tool of claim 1 wherein the flow generating device is designed to generate the flow in the presence of the sensing field.

4. The tool of claim 1 wherein the at least two different flow conditions comprise the condition of a flow being present at a time of registering the sensor responses.

5. The tool of claim 1 wherein the sensor response are indicative of saturations of water and/or hydrocarbon phases.

6. The tool of claim 1 designed to determine at least one of residual oil saturation (ROS) or residual water saturation (Swr).

7. The tool of claim 1 having a flow generator to sweep hydrocarbon from the formation by injecting fluids into the formation.

8. The tool of claim 7 wherein the injected fluid is an Enhanced Oil Recovery (EOR) fluid designed to change the recovery rate of hydrocarbons from the formation.

9. The tool of claim 1 having a flow generator to inject fluids into and withdraw fluids from the formation.

10. The tool of claim 1 further comprising a flowmeter to determine flow rates of fluids passing through the tool.

11. The tool of claim 1 having a flowmeter to determine flow rates of at least one of water or hydrocarbon flow passing through the tool.

12. A method of characterizing a subterranean formation comprising the steps of:
moving a pad having a nuclear magnetic resonance (NMR) sensing device into contact with a wall of a borehole formed in the formation, the NMR sensing device of the pad including a magnetic material and an antenna disposed in a recess formed on an outer surface of the pad that contacts a wall of a borehole penetrating the formation;
generating a magnetic sensing field in a measuring volume of the formation using the magnetic material;
using a flow generating device to cause a flow through the measuring volume by performing at least one of injecting fluids into the formation or withdrawing fluids from the formation;
using NMR sensors responsive to changes in the sensing field to obtain sensor responses indicative of an amount of constituent fluid phases in the measuring volume under at least two different flow conditions in the formation.

13. The method of claim 12 wherein the at least two different flow conditions include at least one of the condition before the flow generating device caused the flow and the condition after the flow generating device caused the flow.

14. The method of claim 12 wherein the flow is generated by the flow generating device in the presence of the sensing field.

15. The method of claim 12 wherein the at least two different flow conditions comprises the condition of a flow being present at a time of registering the sensor responses.

16. The method of claim 12 comprising determining saturations of water and/or hydrocarbon phases.

17. The method of claim 12 comprising the step of determining at least one of residual oil saturation (ROS) or residual water saturation (Swr).

18. The method of claim 12 comprising the step of injecting fluids into the formation to sweep hydrocarbons from the formation.

19. The method of claim 18, wherein the injected fluid is an Enhanced Oil Recovery (EOR) fluid designed to change the recovery rate of hydrocarbons from the formation.

20. The method of claim 12 comprising injecting fluids into and withdrawing fluids from the formation.

21. The method of claim 12 further comprising the step of measuring in the wellbore flow rates of fluids representative of fluid passing through the formation.

22. A method of characterizing a fluid-bearing formation, comprising:
 moving a pad having a nuclear magnetic resonance (NMR) sensing device into contact with a wall of a borehole formed in the fluid-bearing formation, wherein NMR sensing device of the pad includes a magnetic material and an antenna disposed in a recess formed on the surface of the pad that contacts the wall;
 generating a magnetic field in the fluid-bearing formation using the magnetic material;
 using the recessed antenna to deliver a first set of NMR pulses into a measuring volume in the fluid-bearing formation;
 measuring an NMR response signal from the measuring volume;
 causing fluid to flow in the fluid-bearing formation;
 using the recessed antenna to deliver a second set of NMR pulses into the measuring volume; and
 measuring a second NMR response signal from the measuring volume.

23. The method of claim 22, further comprising:
 using the recessed antenna to deliver a third set of NMR pulses into the measurement volume while causing fluid to flow in the fluid-bearing formation; and
 measuring a third NMR response signal from the measuring volume while causing fluid to flow in the fluid-bearing formation.

24. The method of claim 22, wherein causing fluid to flow in the fluid-bearing formation comprises either injecting fluid into the fluid-bearing formation or withdrawing fluid from the fluid-bearing formation.

25. The tool of claim 1, wherein the recess enhances the effective area in which the fluids are injected into the formation.

26. The tool of claim 1, wherein the fluid is injected into the formation through a flowline having an opening through the recess of the pad, and wherein the antenna is positioned around the flowline within the recess.

* * * * *